UNITED STATES PATENT OFFICE.

FREDERICK DRITTLER, OF RUTHERFORD, NEW JERSEY, ASSIGNOR TO THE ARABOL MANUFACTURING COMPANY, OF NEW YORK, N. Y., A CORPORATION OF NEW YORK.

PROCESS OF TREATING STARCH.

No. 847,658.      Specification of Letters Patent.      Patented March 19, 1907.

Application filed March 9, 1906. Serial No. 305,154.

*To all whom it may concern:*

Be it known that I, FREDERICK DRITTLER, (a former subject of the Emperor of Germany, having declared his intention to become a citizen of the United States,) a resident of Rutherford, in the county of Bergen and State of New Jersey, have invented certain new and useful Improvements in the Processes of Treating Starch, of which the following is a specification.

My invention relates to a process for rendering starch capable of swelling in cold water, and consists, essentially, in mixing dry powdered commercial starch with a suitable quantity of a liquid hydrocarbon or hydrocarbons and then adding a suitable quantity of caustic alkali.

In carrying out my process I take one hundred parts, by weight, of pulverized dry starch, such as ordinary corn-starch, and treat this with approximately eighty parts, by weight, of a liquid hydrocarbon or hydrocarbons or with sufficient volume thereof to make a semifluid mass, and thoroughly mix the two by stirring. By the term "hydrocarbon" I wish to include all hydrocarbons which are chemically inactive with respect to starch and at ordinary temperatures are liquids of an oily nature and practically insoluble in or non-miscible with water. I have also found that the halogen substitution products and numerous other derivatives of the hydrocarbons will likewise serve so long as they possess the aforesaid properties. However, I do not wish to claim the use of such derivatives in the present application, as they form the subject of a separate application. After trials with many of the hydrocarbons I have found crude paraffin-oil of the specific gravity 0.865 to be a most satisfactory liquid. After the starch has been thoroughly mixed with such a liquid I add forty to fifty parts, by weight, of liquid caustic alkali, as caustic soda, at 30° Baumé for every one hundred parts starch contained in the mixture. The mass upon being thoroughly mixed changes almost instantaneously into a voluminous dry fluffy powder. The hydrocarbon may then be removed from the dry powder by evaporation, and, if desired, the vapor may be condensed by suitable apparatus and used over again. An alkaline starch is thus produced which is capable of swelling in cold water. To prepare a neutral starch of similar properties, an equivalent amount of acid, preferably some organic acid, as acetic, citric, tartaric, oxalic, &c., or watery solutions thereof is added about one hour after the addition of the caustic alkali. If it be desired to remove the hydrocarbon, this is preferably done prior to the neutralization. A perfectly neutral starch capable of swelling in cold water is thereby produced.

Instead of a liquid acid I may use non-hygroscopic acids in the crystalline or powdered condition in equivalent amounts to neutralize the alkali used, the neutralization taking place during the process of swelling upon the immersion in water.

The starch, whether neutral or alkaline, bursts when it comes in contact with water and readily swells in cold water in the proportion of about one to ten parts, more or less, by weight, respectively, forming a viscous mass similar to gum-tragacanth and suitable for most purposes for which the said gum-tragacanth has been used and applied.

For some purposes the presence in the finished starch-powder of hydrocarbons of the class to which my invention refers is of advantage, and in such cases they may be left in the modified starch, which thus, almost immediately after the addition of caustic alkali and acid, is ready for sale without evaporation or distillation.

If, for instance, I wish to make a starch which in solution unites waxed paper or sticks labels on polished, waxed, varnished, or slightly greasy surfaces, on oily leather, and on metals, the surface of which repels ordinary starch-paste, I use an appropriate hydrocarbon which has a dissolving, and therefore combining, action on such surfaces and will not evaporate at normal temperature and allow it to remain in the finished starch-powder.

I am aware that it has been demonstrated by various authorities that a neutral starch capable of swelling in cold water can be obtained by treating starch with caustic alkali, neutralizing with suitable acid, and then precipitating with alcohol. I am also aware that attempts have been made to produce starch with similar properties by substantially reversing the said process—that is, by treating starch suspended in a mixture of equal parts of water and any of the water-soluble alcohols with caustic alkali, (see German Patent No. 157,896 of July 3, 1903); also that in place of the alcohol a solution of a suitable soda or potash salt, as Glauber's salt, may be used. (See German Patent No. 166,259 of May 3, 1905.) In either case the starch is suspended in a water-soluble medium before treatment with the caustic alkali, and thereby the epidermis of the starch granules becomes partly or entirely corrugated or weakened to such a degree that as soon as the caustic alkali is added the epidermis bursts. The contents of the granules thus flow out, intermingle, and form a coherent paste, so that either in the alkaline state or after neutralization a tough pliable homogeneous mass is obtained. To remove from this mass the alcohol, alkali, acid, salts, &c., as the case may be, it must be pressed or centrifugated, dried, and powdered. These operations are costly and practically do not allow of the recovery of the alcohol for repeated use. The process forming the subject of the present invention provides for the use of a liquid hydrocarbon of an oily nature and practically insoluble in or non-miscible with water in place of the alcohol or other water soluble compounds with which the starch is first treated in the aforesaid processes. The action of such liquids upon the epidermis of the starch granules is only to make it elastic and permeable for a concentrated solution of caustic alkali. After treatment with caustic alkali under such conditions the starch granules do not burst, as in the former cases, and instead of forming a tough paste-like mass a light fluffy powder of about double the original volume of the starch is obtained, the alkali penetrating the epidermis and combining with the inner part of the granules and swelling them accordingly. In case of neutralization the acid, if liquid, likewise penetrates the epidermis and acts upon the contained alkali.

The hydrocarbon, which is usually selected to be volatile at a moderate temperature, may be removed by evaporation or recovered by distillation to be used over again, if desired.

The dry powder, either alkaline or neutral, is the finished product—a modified starch, retaining the original structure of the grain, requiring no further treatment—such as pressing, centrifugating, drying, and grinding—and is capable of swelling in cold water.

The essential difference between my process and the aforementioned processes is the use of a liquid of an oily nature and practically insoluble in or non-miscible with water as a suspending medium. I thereby obtain a new and different product—viz., a cold-water-swelling starch, the grains of which are intact, though somewhat enlarged, and which need not be pressed, dried, and ground in order to bring it from a paste or semipaste form into a dry and marketable condition.

What I claim as new, and desire to secure by Letters Patent of the United States, is—

1. The herein-described process for rendering starch capable of swelling in cold water, consisting in: first mixing the starch with a liquid hydrocarbon; and then adding caustic alkali.

2. The herein-described process for rendering starch capable of swelling in cold water, consisting in: first mixing the starch with a liquid hydrocarbon; then adding caustic alkali; and finally removing said hydrocarbon.

3. The herein-described process for rendering starch capable of swelling in cold water, consisting in: first mixing the starch with a liquid hydrocarbon; adding caustic alkali; removing said hydrocarbon; and finally neutralizing said alkaline starch.

4. The herein-described process for rendering starch capable of swelling in cold water, consisting in: first mixing the dry starch with crude paraffin-oil; and then adding caustic alkali.

5. The herein-described process for rendering starch capable of swelling in cold water, consisting in: first mixing the dry starch with crude paraffin-oil; adding caustic alkali; and then removing said paraffin-oil.

6. The herein-described process for rendering starch capable of swelling in cold water, consisting in: first mixing the dry starch with crude paraffin-oil; adding caustic alkali; removing said paraffin-oil; and finally neutralizing said alkaline starch.

7. Starch cells with unbroken epidermis, capable of swelling in cold water to form a viscous, paste-like mass.

8. Neutral starch cells with unbroken epidermis, capable of swelling in cold water to form a viscous, paste-like mass.

Signed at New York, in the county of New York and State of New York, this 7th day of March, A. D. 1906.

FREDERICK DRITTLER.

Witnesses:
LEOPOLD M. SCHILD,
FREDK. F. SCHUETZ.